United States Patent
Fu et al.

(10) Patent No.: US 11,984,807 B2
(45) Date of Patent: May 14, 2024

(54) POWER CONVERTER AND CONTROL METHOD THEREOF

(71) Applicant: Richtek Technology Corporation, Zhubei (TW)

(72) Inventors: Jian-Ming Fu, Zhubei (TW); Huan-Chien Yang, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 222 days.

(21) Appl. No.: 17/734,396

(22) Filed: May 2, 2022

(65) Prior Publication Data

US 2023/0268834 A1 Aug. 24, 2023

Related U.S. Application Data

(60) Provisional application No. 63/312,123, filed on Feb. 21, 2022.

(30) Foreign Application Priority Data

Apr. 13, 2022 (TW) ................................. 111114035

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC ........................... H02M 1/0009; H02M 3/158
See application file for complete search history.

(56) References Cited

U.S. PATENT DOCUMENTS

| | | | |
|---|---|---|---|
| 9,960,620 B2 | 5/2018 | Kinzer et al. | |
| 10,439,483 B2 | 10/2019 | Tsyrganovich et al. | |
| 2014/0070781 A1* | 3/2014 | Yanagida | G05F 1/10 323/271 |
| 2015/0346747 A1* | 12/2015 | Park | H05B 45/375 323/281 |
| 2016/0124447 A1 | 5/2016 | Kobayashi | |

(Continued)

FOREIGN PATENT DOCUMENTS

| | | |
|---|---|---|
| TW | 201235811 A | 9/2012 |
| TW | 201937837 A | 9/2019 |
| TW | 202129455 A | 8/2021 |

*Primary Examiner* — Harry R Behm
(74) *Attorney, Agent, or Firm* — McClure, Qualey & Rodack, LLP

(57) ABSTRACT

A power converter includes an upper-gate circuit, a lower-gate circuit, an inductor, a first current sensor, a second current sensor, a weight adjustment circuit, and a PWM (Pulse Width Modulation) controller. The upper-gate circuit receives an input voltage. The lower-gate circuit is coupled to a ground node. The upper-gate circuit and the lower-gate circuit are operated according to the PWM voltage. The inductor is coupled to the upper-gate circuit and the lower-gate circuit. The first current sensor monitors the upper-gate circuit, so as to generate a first detection current. The second current sensor monitors the lower-gate circuit, so as to generate a second detection current. The weight adjustment circuit generates a control current according to the first detection current and the second detection current. The PWM controller generates the PWM voltage according to the control current.

17 Claims, 5 Drawing Sheets

(56) References Cited

U.S. PATENT DOCUMENTS

2018/0226877 A1\* 8/2018 Fukumoto ........... H02M 3/1588
2019/0238100 A1   8/2019 Kimura
2020/0067409 A1\* 2/2020 Li ........................... H02M 1/08

\* cited by examiner

POWER CONVERTER AND CONTROL METHOD THEREOF

CROSS REFERENCE TO RELATED APPLICATIONS

This Application claims priority to U.S. Provisional Application Ser. No. 63/312,123, filed on Feb. 21, 2022, and also claims priority of Taiwan Patent Application No. 111114035 filed on Apr. 13, 2022, the entirety of which is incorporated by reference herein.

BACKGROUND OF THE INVENTION

Field of the Invention

The disclosure generally relates to a power converter, and more specifically, to a power converter for increasing output stability.

Description of the Related Art

In a conventional power converter, because the variation range of an input voltage is too wide, it tends to cause the output voltage to fluctuate violently, thereby resulting in poor output stability of the conventional power converter. Accordingly, there is a need to propose a novel solution for solving the problems of the prior art.

BRIEF SUMMARY OF THE INVENTION

In an exemplary embodiment, the invention is directed to a power converter that includes an upper-gate circuit, a lower-gate circuit, an inductor, a first current sensor, a second current sensor, a weight adjustment circuit, and a PWM (Pulse Width Modulation) controller. The upper-gate circuit receives an input voltage. The lower-gate circuit is coupled to a ground node. The upper-gate circuit and the lower-gate circuit are operated according to the PWM voltage. The inductor is coupled to the upper-gate circuit and the lower-gate circuit. The inductor is configured to output an output voltage. The first current sensor monitors the upper-gate circuit, so as to generate a first detection current. The second current sensor monitors the lower-gate circuit, so as to generate a second detection current. The weight adjustment circuit generates a control current according to the first detection current and the second detection current. The PWM controller generates the PWM voltage according to the control current.

In some embodiments, the upper-gate circuit includes a first transistor. The first transistor has a control terminal for receiving the PWM voltage, a first terminal coupled to an input node for receiving the input voltage, and a second terminal coupled to a common node.

In some embodiments, the lower-gate circuit includes a second transistor. The second transistor has a control terminal for receiving the PWM voltage, a first terminal coupled to the ground node, and a second terminal coupled to the common node.

In some embodiments, the inductor has a first terminal coupled to the common node, and a second terminal coupled to an output node for outputting the output voltage.

In some embodiments, the control current is a linear combination of the first detection current and the second detection current.

In some embodiments, the control current is determined using the following equation:

$$IN = IA \cdot X + IB \cdot Y$$

where "IN" represents the control current, "IA" represents the first detection current, "IB" represents the second detection current, "X" represents a first weight parameter, and "Y" represents a second weight parameter.

In some embodiments, the sum of the first weight parameter and the second weight parameter is equal to 1.

In some embodiments, the control current is a nonlinear combination of the first detection current and the second detection current.

In some embodiments, the weight adjustment circuit includes a transconductance amplifier. The transconductance amplifier has a positive input terminal for receiving the input voltage, a negative input terminal for receiving K times the output voltage, and an output terminal for outputting a differential current.

In some embodiments, the weight adjustment circuit includes further includes a first current subtractor. The first current subtractor subtracts the differential current from the second detection current, so as to generate a first tuning current.

In some embodiments, the weight adjustment circuit includes further includes a second current subtractor. The second current subtractor subtracts the first tuning current from the first detection current, so as to generate a second tuning current.

In some embodiments, the weight adjustment circuit includes further includes a current adder. The current adder adds the second tuning current to the first tuning current, so as to generate the control current.

In another exemplary embodiment, the invention is directed to a control method that includes the steps of: providing an upper-gate circuit, a lower-gate circuit, and an inductor, wherein the inductor is coupled to the upper-gate circuit and the lower-gate circuit, the upper-gate circuit and the lower-gate circuit are operated according to a PWM (Pulse Width Modulation) voltage, the upper-gate circuit receives an input voltage, and the inductor outputs an output voltage; monitoring the upper-gate circuit, so as to generate a first detection current; monitoring the lower-gate circuit, so as to generate a second detection current; generating a control current according to the first detection current and the second detection current; and generating the PWM voltage according to the control current.

In some embodiments, the control method further includes: generating a differential current according to the input voltage and K times the output voltage via a transconductance amplifier.

In some embodiments, the control method further includes: subtracting the differential current from the second detection current, so as to generate a first tuning current; and subtracting the first tuning current from the first detection current, so as to generate a second tuning current.

In some embodiments, the control method further includes: adding the second tuning current to the first tuning current, so as to generate the control current.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
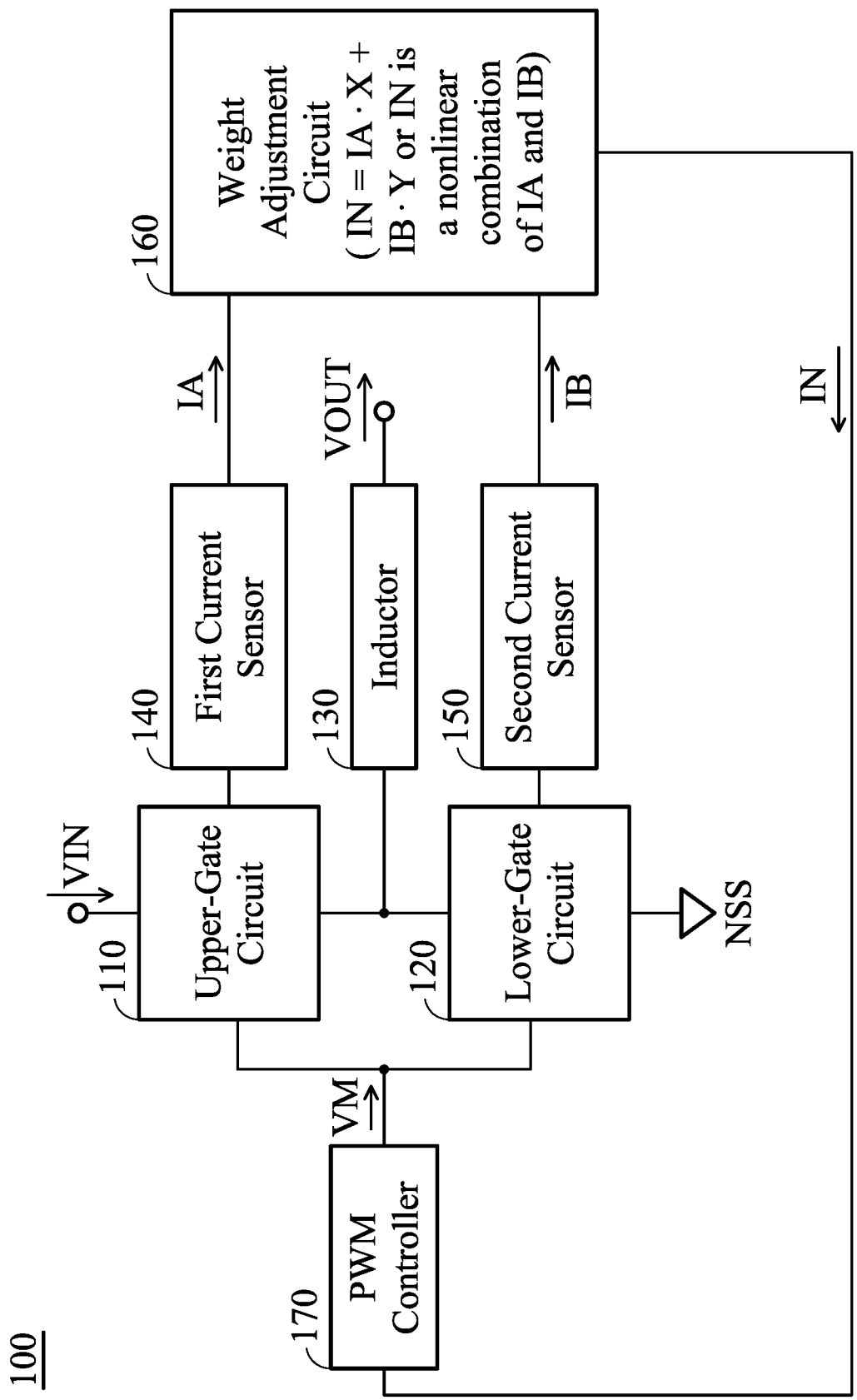
FIG. 1 is a diagram of a power converter according to an embodiment of the invention.

FIG. 1 is a diagram of a power converter 100 according to an embodiment of the invention. For example, the power converter 100 may be applied to a mobile device or an automotive chip, but it is not limited thereto. In the embodiment of FIG. 1, the power converter 100 includes an upper-gate circuit 110, a lower-gate circuit 120, an inductor 130, a first current sensor 140, a second current sensor 150, a weight adjustment circuit 160, and a PWM (Pulse Width Modulation) controller 170. It should be understood that the power converter 100 may include other components, such as a processor, a power supply module, and/or a driving circuit, although they are not displayed in FIG. 1.

The upper-gate circuit 110 receives an input voltage VIN. For example, the input voltage VIN may have a relatively wide input range. The lower-gate circuit 120 is coupled to a ground node NSS. The ground node NSS provides a ground voltage. The upper-gate circuit 110 and the lower-gate circuit 120 are operated according to a PWM (Pulse Width Modulation) voltage VM. The inductor 130 is coupled to both of the upper-gate circuit 110 and the lower-gate circuit 120. The inductor 130 is further configured to output an output voltage VOUT. The first current sensor 140 monitors the state of the upper-gate circuit 110, so as to generate a first detection current IA. The second current sensor 150 monitors the state of the lower-gate circuit 120, so as to generate a second detection current IB. The weight adjustment circuit 160 generates a control current IN according to the first detection current IA and the second detection current IB. The PWM controller 170 generates the aforementioned PWM voltage VM according to the control current IN. With the design of the invention, the relative operational information of the upper-gate circuit 110 and the lower-gate circuit 120 can be obtained by analyzing the first detection current IA and the second detection current IB, respectively. In addition, the weight adjustment circuit 160 can suppress the fluctuations of the control current IN by appropriately integrating the first detection current IA with the second detection current IB. According to practical measurements, the proposed power converter 100 can help to reduce its transient response time, suppress its distortion, and enhances the overall output stability.

The following embodiments will introduce the detailed structures and the operational principles of the power converter 100. It should be understood these figures and descriptions are merely exemplary, rather than limitations of the invention.

Figure 2:
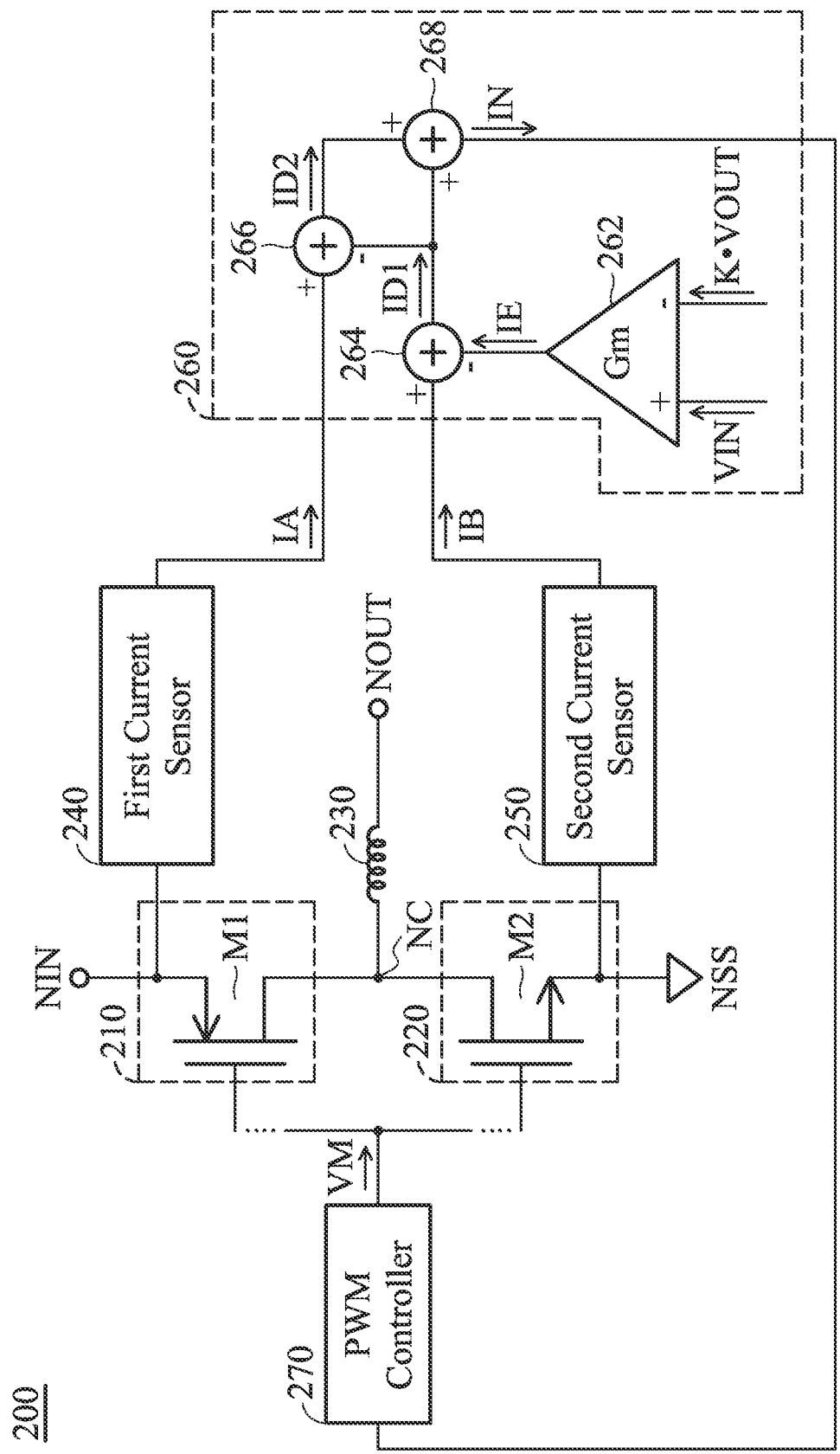
FIG. 2 is a circuit diagram of a power converter according to an embodiment of the invention.

FIG. 2 is a circuit diagram of a power converter 200 according to an embodiment of the invention. In the embodiment of FIG. 2, the power converter 200 with an input node NIN and an output node NOUT includes an upper-gate circuit 210, a lower-gate circuit 220, an inductor 230, a first current sensor 240, a second current sensor 250, a weight adjustment circuit 260, and a PWM controller 270. The input node NIN of the power converter 200 is arranged to receive an input voltage VIN. The output node NOUT of the power converter 200 is arranged to output an output voltage VOUT.

The upper-gate circuit 210 includes a first transistor M1. For example, the first transistor M1 may be a PMOS transistor (P-type Metal Oxide Semiconductor Field Effect Transistor or PMOSFET). Specifically, the first transistor M1 has a control terminal (e.g., a gate) for directly or indirectly receiving a PWM voltage VM, a first terminal (e.g., a source) coupled to the input node NIN, and a second terminal (e.g., a drain) coupled to a common node NC. In some embodiments, if the PWM voltage VM has a high logic level (or a logic "1"), the first transistor M1 will be disabled; conversely, if the PWM voltage VM has a low logic level (or a logic "0"), the first transistor M1 will be enabled. It should be understood that the invention is not limited thereto. In alternative embodiments, the first transistor M1 is implemented with another NMOS transistor (N-type Metal Oxide Semiconductor Field Effect Transistor or NMOSFET).

The lower-gate circuit 220 includes a second transistor M2. For example, the second transistor M2 may be an NMOS transistor. Specifically, the second transistor M2 has a control terminal (e.g., a gate) for directly or indirectly receiving the PWM voltage VM, a first terminal (e.g., a source) coupled to a ground node NSS, and a second terminal (e.g., a drain) coupled to the common node NC. In some embodiments, if the PWM voltage VM has a high logic level, the second transistor M2 will be enabled; conversely, if the PWM voltage VM has a low logic level, the second transistor M2 will be disabled.

The inductor 230 has a first terminal coupled to the common node NC, and a second terminal coupled to the output node NOUT.

The first current sensor 240 monitors the state of the upper-gate circuit 210, so as to generate a first detection current IA. For example, if the current flowing through the first transistor M1 becomes larger, the first detection current IA may increase; conversely, if the current flowing through the first transistor M1 becomes smaller, the first detection current IA may decrease. In some embodiments, the first detection current IA is substantially proportional to the current flowing through the first transistor M1, but it is not limited thereto.

The second current sensor 250 monitors the state of the lower-gate circuit 220, so as to generate a second detection current IB. For example, if the current flowing through the second transistor M2 becomes larger, the second detection current IB may increase; conversely, if the current flowing through the second transistor M2 becomes smaller, the second detection current IB may decrease. In some embodiments, the second detection current IB is substantially proportional to the current flowing through the second transistor M2, but it is not limited thereto.

The weight adjustment circuit 260 generates a control current IN according to the first detection current IA and the second detection current IB. For example, the control current IN may be a linear combination of the first detection current IA and the second detection current IB. In some embodiments, the control current IN is determined using the following equation (1):

$$IN = IA \cdot X + IB \cdot Y \qquad (1)$$

where "IN" represents the control current IN, "IA" represents the first detection current IA, "IB" represents the second detection current IB, "X" represents a first weight parameter, and "Y" represents a second weight parameter.

In some embodiments, the first weight parameter X and the second weight parameter Y are both positive, and the sum of the first weight parameter X and the second weight parameter Y is exactly equal to 1 (i.e., X+Y=1). For example, the first weight parameter X may be set to 30%, and the second weight parameter Y may be set to 70%. Alternatively, the first weight parameter X may be set to 50%, and the second weight parameter Y may be set to 50%. However, the invention is not limited thereto. In alternative embodiments, the control current IN is a nonlinear combination of the first detection current IA and the second detection current IB.

In some embodiments, the weight adjustment circuit 260 includes a transconductance amplifier 262, a first current subtractor 264, a second current subtractor 266, and a current adder 268.

The transconductance amplifier 262 has a positive input terminal for receiving the input voltage VIN, a negative input terminal for receiving K times the output voltage VOUT (i.e., K VOUT), and an output terminal for outputting a differential current IE.

The first current subtractor 264 subtracts the differential current IE from the second detection current IB, so as to generate a first tuning current ID1. It should be noted that the first current subtractor 264 cannot generate any negative value. If the differential current IE is greater than the second detection current IB, the first current subtractor 264 will force the first tuning current ID1 to be 0.

The second current subtractor 266 subtracts the first tuning current ID1 from the first detection current IA, so as to generate a second tuning current ID2. It should be noted that the second current subtractor 266 cannot generate any negative value. If the first tuning current ID is greater than the first detection current IA, the second current subtractor 266 will force the second tuning current ID2 to be 0.

The current adder 268 adds the second tuning current ID2 to the first tuning current ID1, so as to generate the control current IN. In some embodiments, the operational principles of the weight adjustment circuit 260 can be described using the following equations (2) to (5):

$$IE = (VIN - K \cdot VOUT) \cdot Gm \qquad (2)$$

$$ID1 = IB - IE \qquad (3)$$

$$ID2 = IA - ID1 \qquad (4)$$

$$IN = ID1 + ID2 \qquad (5)$$

where "IE" represents the differential current IE, "VIN" represents the input voltage VIN, "K" represents any positive value, "VOUT" represents the output voltage VOUT, "Gm" represents the transconductance of the transconductance amplifier 262, "ID1" represents the first tuning current ID1, "ID2" represents the second tuning current ID2, "IN" represents the control current IN, "IA" represents the first detection current IA, and "TB" represents the second detection current TB.

The PWM controller 270 generates the aforementioned PWM voltage VM according to the control current IN. Since the first detection current IA is appropriately integrated with the second detection current TB by the weight adjustment circuit 260, the fluctuations of the control current IN can be significantly reduced, and the stability of the PWM voltage VM can be effectively enhanced. Finally, even if there is a charge in the input voltage VIN, the power converter 200 can still provide an output voltage VOUT with high output stability.

Figure 3:
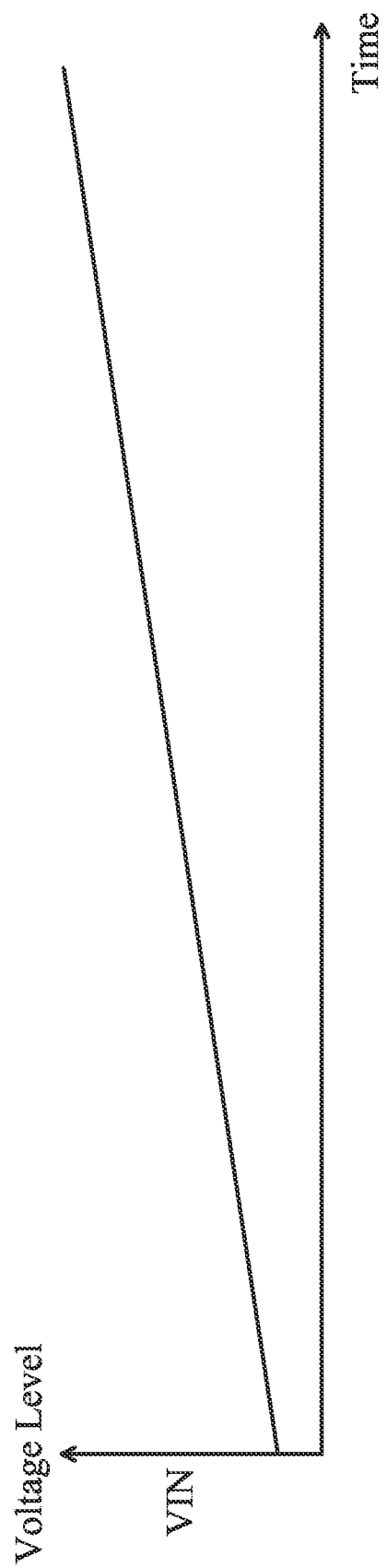
FIG. 3 is a diagram of a voltage waveform of an input voltage of a power converter according to an embodiment of the invention.

FIG. 3 is a diagram of a voltage waveform of the input voltage VIN of the power converter 200 according to an embodiment of the invention. The horizontal axis represents time, and the vertical axis represents the voltage level. As shown in FIG. 3, because of a variety of reasons, the voltage level of the input voltage VIN may be changed. For example, the input voltage VIN may gradually become higher. However, the invention is not limited thereto. In alternative embodiments, the input voltage VIN may gradually become lower.

Figure 4:
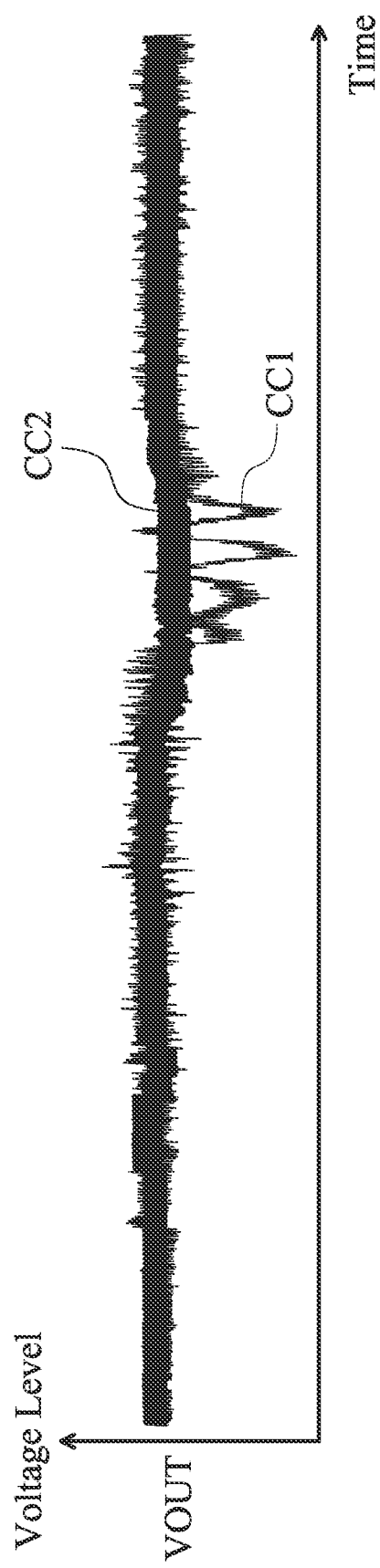
FIG. 4 is a diagram of a voltage waveform of an output voltage of a power converter according to an embodiment of the invention.

FIG. 4 is a diagram of a voltage waveform of the output voltage VOUT of the power converter 200 according to an embodiment of the invention. The horizontal axis represents time, and the vertical axis represents the voltage level. As shown in FIG. 4, a first curve CC1 represents the characteristic of the output voltage VOUT of a conventional power converter, and a second curve CC2 represents the characteristic of the output voltage VOUT of the proposed power converter 200. According to the measurement of FIG. 4, when the voltage level of the input voltage VIN is changed, the output voltage VOUT of the conventional power converter will also fluctuate seriously. However, the output voltage VOUT of the proposed power converter 200 can still be maintained at a relatively stable voltage level. Therefore, the design of the invention can provide better output stability than the conventional design does.

Figure 5:
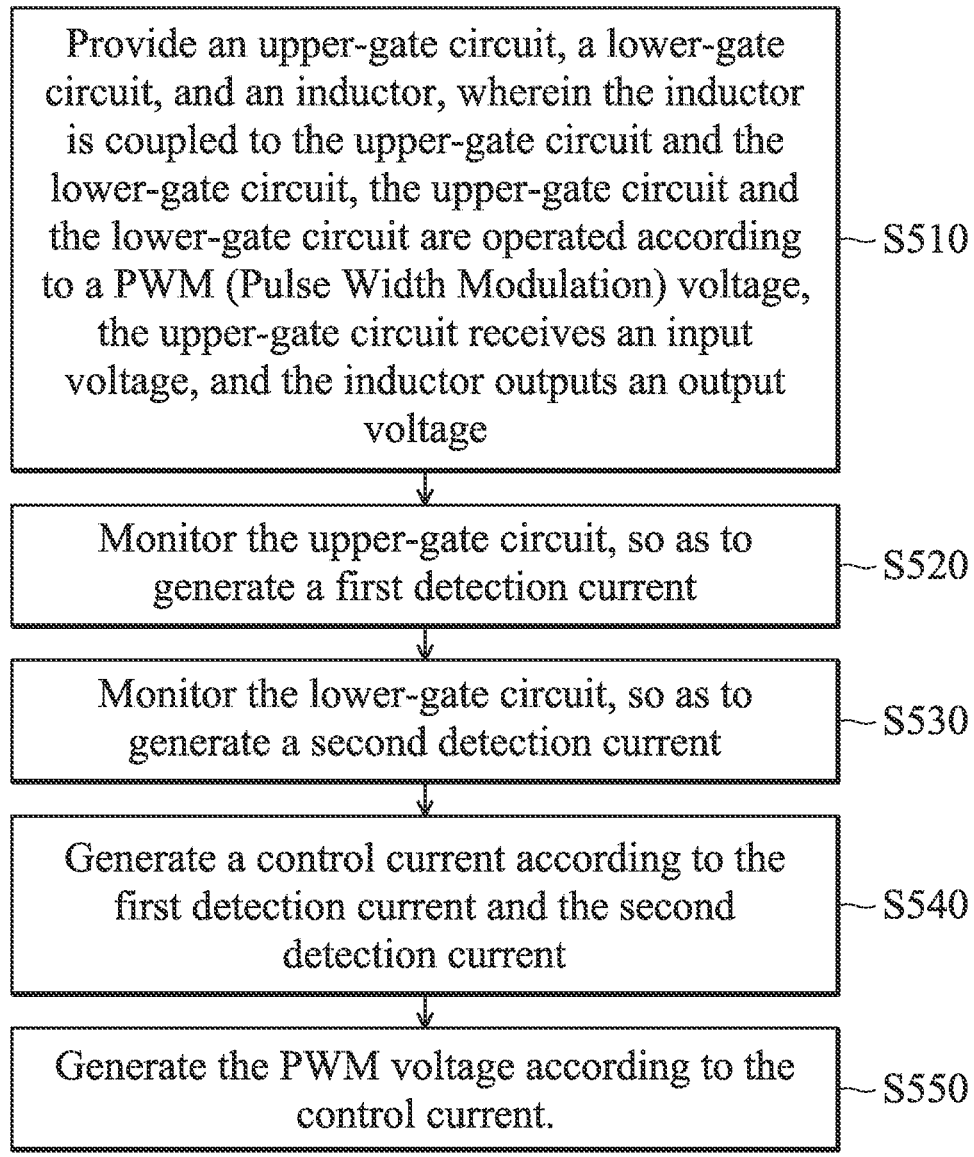
FIG. 5 is a flowchart of a control method for a power converter according to an embodiment of the invention.

FIG. 5 is a flowchart of a control method for the power converter according to an embodiment of the invention. The aforementioned control method includes the following steps. In the step S510, an upper-gate circuit, a lower-gate circuit, and an inductor are provided. The inductor is coupled to the upper-gate circuit and the lower-gate circuit. The upper-gate circuit and the lower-gate circuit are operated according to a PWM voltage. The upper-gate circuit receives an input voltage. The inductor outputs an output voltage. In the step S520, the upper-gate circuit is monitored, so as to generate a first detection current. In the step S530, the lower-gate circuit is monitored, so as to generate a second detection current. In the step S540, a control current is generated according to the first detection current and the second detection current. In the step S550, the PWM voltage is generated according to the control current. It should be noted that the above steps are not required to be performed in order, and all of the features of the embodiments of FIGS. 1 to 4 may be applied to the control method of FIG. 5.

The invention proposes a novel power converter and a control method thereof. In comparison to the conventional design, the invention has at least the advantages of reducing the transient response time, suppressing the distortion, decreasing the circuit complexity, and enhancing the overall output stability, and therefore it is suitable for application in a variety of electronic devices.

Note that the above voltages, currents, resistances, inductances, capacitances and other element parameters are not limitations of the invention. A designer can adjust these parameters according to different requirements. The power converter and the control method of the invention are not limited to the configurations of FIGS. 1-5. The invention may merely include any one or more features of any one or more embodiments of FIGS. 1-5. In other words, not all of the features displayed in the figures should be implemented in the power converter and the control method of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power converter, comprising:
   an upper-gate circuit, receiving an input voltage;
   a lower-gate circuit, coupled to a ground node, wherein the upper-gate circuit and the lower-gate circuit are operated according to a PWM (Pulse Width Modulation) voltage;
   an inductor, coupled to the upper-gate circuit and the lower-gate circuit, wherein the inductor is configured to output an output voltage;
   a first current sensor, monitoring the upper-gate circuit, so as to generate a first detection current;
   a second current sensor, monitoring the lower-gate circuit, so as to generate a second detection current;
   a weight adjustment circuit, generating a control current according to the first detection current and the second detection current; and
   a PWM controller, generating the PWM voltage according to the control current;
   wherein the weight adjustment circuit comprises:
   a transconductance amplifier, wherein the transconductance amplifier has a positive input terminal for receiving the input voltage, a negative input terminal for receiving K times the output voltage, and an output terminal for outputting a differential current; and
   a first current subtractor, subtracting the differential current from the second detection current, so as to generate a first tuning current.

2. The power converter as claimed in claim 1, wherein the upper-gate circuit comprises:
   a first transistor, wherein the first transistor has a control terminal for receiving the PWM voltage, a first terminal coupled to an input node for receiving the input voltage, and a second terminal coupled to a common node.

3. The power converter as claimed in claim 2, wherein the lower-gate circuit comprises:
   a second transistor, wherein the second transistor has a control terminal for receiving the PWM voltage, a first terminal coupled to the ground node, and a second terminal coupled to the common node.

4. The power converter as claimed in claim 2, wherein the inductor has a first terminal coupled to the common node, and a second terminal coupled to an output node for outputting the output voltage.

5. The power converter as claimed in claim 1, wherein the control current is a linear combination of the first detection current and the second detection current.

6. The power converter as claimed in claim 1, wherein the control current is determined using the following equation:

$$IN = IA \cdot X + IB \cdot Y$$

where "IN" represents the control current, "IA" represents the first detection current, "IB" represents the second detection current, "X" represents a first weight parameter, and "Y" represents a second weight parameter.

7. The power converter as claimed in claim 6, wherein a sum of the first weight parameter and the second weight parameter is equal to 1.

8. The power converter as claimed in claim 1, wherein the control current is a nonlinear combination of the first detection current and the second detection current.

9. The power converter as claimed in claim 1, wherein the weight adjustment circuit further comprises:
   a second current subtractor, subtracting the first tuning current from the first detection current, so as to generate a second tuning current.

10. The power converter as claimed in claim 9, wherein the weight adjustment circuit further comprises:
    a current adder, adding the second tuning current to the first tuning current, so as to generate the control current.

11. A control method, comprising the steps of:
    providing an upper-gate circuit, a lower-gate circuit, and an inductor, wherein the inductor is coupled to the upper-gate circuit and the lower-gate circuit, the upper-gate circuit and the lower-gate circuit are operated according to a PWM (Pulse Width Modulation) voltage, the upper-gate circuit receives an input voltage, and the inductor outputs an output voltage;
    monitoring the upper-gate circuit, so as to generate a first detection current;

monitoring the lower-gate circuit, so as to generate a second detection current;

generating a control current according to the first detection current and the second detection current;

generating the PWM voltage according to the control current;

generating a differential current according to the input voltage and K times the output voltage via a transconductance amplifier; and subtracting the differential current from the second detection current, so as to generate a first tuning current.

12. The control method as claimed in claim 11, wherein the control current is a linear combination of the first detection current and the second detection current.

13. The control method as claimed in claim 11, wherein the control current is determined using the following equation:

$$IN = IA \cdot X + IB \cdot Y$$

where "IN" represents the control current, "IA" represents the first detection current, "IB" represents the second detection current, "X" represents a first weight parameter, and "Y" represents a second weight parameter.

14. The control method as claimed in claim 13, wherein a sum of the first weight parameter and the second weight parameter is equal to 1.

15. The control method as claimed in claim 11, wherein the control current is a nonlinear combination of the first detection current and the second detection current.

16. The control method as claimed in claim 11, further comprising:

subtracting the first tuning current from the first detection current, so as to generate a second tuning current.

17. The control method as claimed in claim 16, further comprising:

adding the second tuning current to the first tuning current, so as to generate the control current.

\* \* \* \* \*